T. J. CLINTON.
METHOD OF PRESERVING PERISHABLE PRODUCTS.
APPLICATION FILED APR. 16, 1917.
1,251,476.
Patented Jan. 1, 1918.
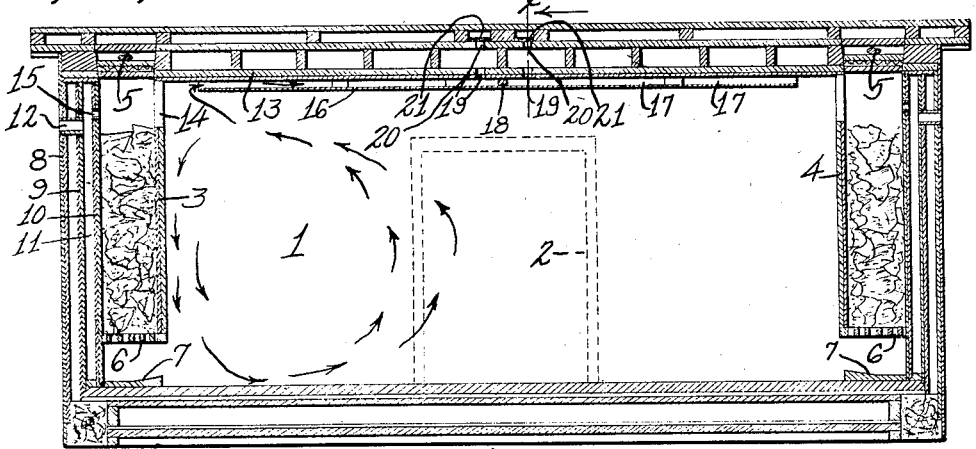
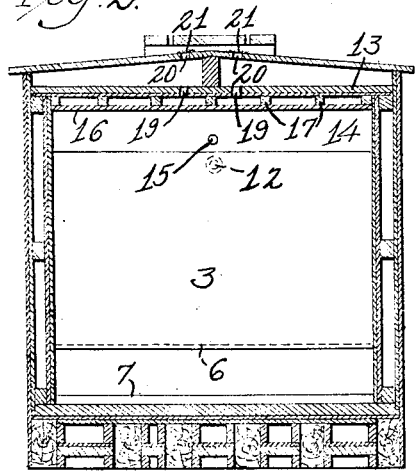
Fig. 2.
Fig. 1.
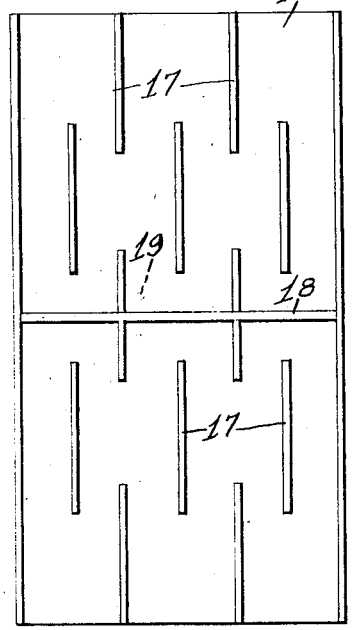
Fig. 3.
Inventor
THOMAS J. CLINTON

UNITED STATES PATENT OFFICE.

THOMAS J. CLINTON, OF DETROIT, MICHIGAN, ASSIGNOR TO UNITED REFRIGERATORS COMPANY, OF DETROIT, MICHIGAN, A CORPORATION OF MICHIGAN.

METHOD OF PRESERVING PERISHABLE PRODUCTS.

1,251,476.

Specification of Letters Patent.

Patented Jan. 1, 1918.

Substitute for abandoned application Serial No. 855,582, filed August 7, 1914. This application filed April 16, 1917. Serial No. 162,425.

*To all whom it may concern:*

Be it known that I, THOMAS J. CLINTON, a citizen of the United States, residing at Detroit, county of Wayne, State of Michigan, have invented a certain new and useful Improvement in Methods of Preserving Perishable Products, and declare the following to be a full, clear, and exact description of the same, such as will enable others skilled in the art to which it pertains to make and use the same, reference being had to the accompanying drawings, which form a part of this specification.

This invention relates to a method of preserving perishable products in refrigerators of various types and capacities and for various uses as cold storage houses, refrigerator cars, or refrigerators for household or other use, and an object of the invention is a method whereby gases and moisture arising from the stored material may be separated from the circulating body therein and discharged from the compartment and fresh air introduced into the circulating body whereby the circulating body is maintained in a substantially pure state and at the required temperature necessary to prevent deterioration of the product.

The accompanying drawings disclose one type of refrigerator by means of which the herein described method may be put into practice, although it is to be fully understood that the same method may be utilized in refrigerators of any particular type.

In the drawings—

Figure 1 is a longitudinal vertical section of a refrigerator car constructed and arranged for the performance of my improved method.

Fig. 2 is a section taken on line $x$—$x$ of Fig. 1.

Fig. 3 is a plan view of a shield formed at the ceiling of the car or storage chamber showing an arrangement of air passages between the shield and supporting ceiling.

In any type of refrigerator within my knowledge, fruits and vegetables and other products of a perishable nature will ripen or deteriorate even though the temperature within the car is considerably less than that of outside atmosphere and meats also become discolored and covered with a slime if kept for a sufficient period. I have found by experiment that this ripening of fruit and the like and the deterioration of perishable products in general is caused by the presence of a gas (mainly carbon dioxid) arising from the product and confined within the storage compartment and combining with the moisture introduced thereinto from the icing chamber forms a slime on meats, and a mold on vegetables and fruits.

By the method herein described, foul air, gases and moisture are removed from the storage compartment and previously cooled fresh air introduced in place thereof by reason of the flow of gas from the compartment and continuously subjecting the product to a circulating body of cool air of substantially natural density and composition.

Apparatus by means of which the process may be performed is shown in the accompanying drawings illustrative of a refrigerator car in which the car body 1 is of any approved type of construction provided with doors at the side as indicated by dotted lines 2. At each end of the car are shown ice bunkers 3 and 4 each provided with hatches 5, 5 reached through the usual openings in the car roof which are also closed by hatches in the usual manner, but not here shown. The bunkers are provided with a slotted bottom 6 spaced from the floor of the car below which is a drip pan 7 ordinarily provided with a drain pipe (but not here shown). The car body is preferably formed with spaced double walls 8 and 9 which are lined upon the inner surface to shield the interior of the car from outside heat. The rear wall 10 is also spaced from the inner wall 9 providing an air space or chamber 11, which is in communication with the exterior of the car by means of the conduit 12 preferably positioned near the top at about the level of ice in the ice bunker. Each ice bunker extends preferably entirely across the end of the car as does also the air chamber 11, while the inner wall of the ice bunker does not extend to the car ceiling 13, thus providing an opening 14 into the storage compartment at the upper end of the ice chamber. Opposite the opening 14 and somewhat higher than the upper edge of the inner wall is an opening 15 providing a means of communication between the air space 11 and the storage compartment.

A false ceiling 16 is provided attached to the car ceiling proper and having the same width as the storage compartment but less in length extending nearly to the openings 14 over the ice chambers at each end of the car. This false ceiling or shield 16 is spaced from the car ceiling 13 by short strips 17, 17 etc., placed in staggered relation as shown more clearly in Fig. 3, thus providing channels or conduits for the passage of air or gas as hereinafter described. Transversely of the shield is placed a cross-piece 18 dividing the space between the shield 16 and the car ceiling into two similar compartments, one having an open end near one of the ice bunkers and the other opening near said other ice compartment. Near the cross member 18 upon each side thereof are provided discharge openings 19, 19 leading into a space between the ceiling and roof of the car in the construction here shown, and the car roof is also provided with similar openings 20, 20 in communication with the same spaces. These openings 20 are preferably provided with a screen 21 to prevent dust from passing into the compartments through the said openings. The tube 12 should also be provided with a similar screen.

With ice in the bunkers, a circulation of air in the storage compartment is produced as is indicated by the arrows to the left of Fig. 1, and with the two ice compartments shown, this circulation is set up at each end of the car which is the usual path of circulation of air in any ordinary refrigerator or refrigerator car. It is to be understood that a single conduit or flue opening at the upper end of the ice compartment and leading to the openings in the car roof or storage chamber may be utilized with equal facility especially if the storage compartment is of small capacity.

With fruit or other perishable products in the refrigerator, a gas (principally carbon dioxid) is formed which, if the refrigerator be tightly closed as is usual, will cause pressure within the car and as the gas circulates with the air it tends to hasten the ripening or deterioration of the product. This continual circulation of foul air is the principal reason that various products of a perishable nature may not be kept in the same compartment without contamination.

With applicant's device and by reason of the circulation naturally set up in the compartment by means of the ice, the cooled air flowing downward adjacent the ice compartment forces the gases upward from the bottom of the refrigerator toward the ceiling and thence each way toward the top of the ice bunker thus forcing the gases and warmer air to position to flow between the shield and the ceiling of the car and out through the vents 20 and 21. A portion of the circulating body thus readily flows from the compartment which is open to atmosphere at a point lower than the outlet. The channel 16 may be dispensed with but it is preferable to use it at the top of the space to cause the atmosphere of the compartment to flow from the center toward the bunkers, the draft created at that point being largely depended upon to cause movement of the air into the compartment through the tubes 12 and aperture 15 over the ice in the ice bunkers and is thus introduced into the compartment and circulating body at about the same temperature as that of the circulating body. The inlets 12 in a car of the usual capacity are about 1 inch in diameter and the vents 19 and 20 are each about 1½ inch. Therefore, no great volume of air may be introduced, the requirement being that the inlet should be a size to allow air to flow in quantity that is sufficient to replace the volume of gas produced by the stored material and discharged from the compartment.

Air flowing into the storage compartment through the air opening 15 is drawn from the air space 11 which is supplied through the tubes 12. The outside air thus first contacts the wall 10 of the chamber and is somewhat cooled prior to passing through the inlet 15 and by placing the inlet 15 higher than the tube 12 the outside air may not pass directly into the compartment thus providing time interval for the cooling of the air. This flow of air is believed to be continuous that is, as the gas arises from the product and the foul air passes out of the storage compartment through the openings 20, fresh air is drawn into the compartment and continues to flow thereinto as long as there is discharge of gas and foul air therefrom.

The method, therefore, consists in subjecting the product to the influence of circulating cooled air in a chamber while separated or segregated from atmosphere, continuously separating the gas and foul air arising from the product from the circulating body and introducing cooled fresh air into the circulating body. As before stated the method may be performed in a properly constructed refrigerator of any type having a storage compartment protected from the influence of warm atmosphere and subject to the influence of air circulating within the compartment and cooled by a refrigerating element, for instance, ice or the cooling coils of an artificial refrigerating system. By the arrangement of the aperture 12 and 15 and flue 16 as stated, the gas or foul air is continuously separated from the circulating air and the circulating body is maintained in a substantially pure condition by introduction of fresh cooled air.

While I am aware of other refrigerators in which an opening is provided for the escape of gas and also an opening for the introduction of fresh air, yet in no case within my knowledge are the gases and foul air separated from the circulating body previous to its discharge from the compartment and replaced with fresh air cooled previous to its introduction into the storage compartment.

Having thus briefly described my invention, its utility and mode of operation, what I claim and desire to secure by Letters Patent of the United States is—

1. The herein described method of preventing deterioration of perishable products which consists in subjecting the product, while segregated from the atmosphere, to the influence of air naturally circulating by influence of a cooling medium, separating the gases and foul air from the circulating body by means of a vent to atmosphere in the upper part of the compartment, the circulation causing movement of the gases toward the vent, and introducing fresh air into the compartment by influence of the movement of gases and air through the vent.

2. The method of preventing deterioration of perishable products consisting in placing the product in a compartment to shield it from the influence of atmosphere and subjecting the same to the influence of air naturally circulating by influence of a cooling medium, continuously discharging the gases and foul air produced by the products from the upper part of the compartment adjacent the cooling medium, and introducing fresh air into the compartment at a point below the outlet by influence of the movement of gases and foul air from the compartment.

3. The herein described method of preventing deterioration of perishable products consisting in subjecting the product, while segregated from the normal atmosphere, to the influence of air caused to circulate by a cooling medium, continuously discharging gases and foul air from the circulating body and introducing cooled fresh air into the circulating body by influence of the discharge of said gases.

4. The herein described method of preventing deterioration of perishable products consisting in subjecting the product, while in the compartment and segregated from normal atmosphere, to the influence of air caused to circulate by a cooling medium, separating a portion of the gases and warmer air from the circulating body and discharging the same from the compartment, and maintaining the circulating body in substantially natural condition by introducing previously cooled fresh air thereinto by influence of the discharge of the gases from the compartment.

5. The herein described method of preventing deterioration of perishable products consisting in subjecting the product, while in a storage compartment, to the influence of air caused to circulate by a cooling medium, causing a portion of the gases and foul air arising from the product to flow out of the circulating body and thence from the compartment, and introducing previously cooled fresh air into the circulating body by influence of the flow of said gases and foul air therefrom.

6. The herein described method of preventing deterioration of perishable products consisting in subjecting the product, while in a storage compartment and segregated from atmosphere, to the influence of air caused to circulate therein by a cooling medium located within the compartment at one side thereof whereby the circulation is downward contiguous to the cooling medium and outward from the medium at the bottom, forcing the gases and foul air toward the top of the compartment, and causing said displaced gases and foul air to flow toward the top of the cooling medium by means of a flue opening to atmosphere at one end and opening into the compartment at the top adjacent the cooling medium whereby a portion of the gases in the air are drawn into the flue and separated from the circulating body and introducing fresh air into the compartment over and in contact with the cooling medium by influence of the movement of the gases and air from the compartment, the inlet being at a point below the point of separation of the gases from the circulating body.

7. The method of preventing deterioration of perishable products, consisting in subjecting the product while segregated from normal atmosphere to the influence of cooled air caused to circulate within the compartment, continuously discharging gases and foul air from the circulating body, and introducing cooled fresh air into the circulating body by influence of the said discharge.

In testimony whereof, I sign this specification.

THOMAS J. CLINTON.